US006552262B2

(12) United States Patent
English et al.

(10) Patent No.: US 6,552,262 B2
(45) Date of Patent: Apr. 22, 2003

(54) COVER ASSEMBLY WITH PIVOTING ACCESS DOORS

(75) Inventors: Stephen T. English, Williamstown, WV (US); John Kohaut, Port Murry, NJ (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 10/054,641

(22) Filed: Jan. 22, 2002

(65) Prior Publication Data

US 2002/0096351 A1 Jul. 25, 2002

Related U.S. Application Data (60) Provisional application No. 60/263,483, filed on Jan. 23, 2001.

(51) Int. Cl.[7] .................................................. H02G 3/22
(52) U.S. Cl. ............................ 174/48; 174/48; 174/66; 174/67; 174/51; 174/54; 174/50; 49/208; 49/381; 49/66; 49/60; 49/68; 49/65; 49/56; 220/241; 220/242; 220/810; 16/221
(58) Field of Search ............................. 174/48, 66, 67, 174/51, 54, 50; 220/241, 242, 810; 49/208, 381, 66, 60, 68, 65, 56; 16/221

(56) References Cited

U.S. PATENT DOCUMENTS

| 2,672,749 A | 3/1954 | Wiesmann | 72/16 |
|---|---|---|---|
| 3,646,244 A | 2/1972 | Cole | 174/57 |
| 3,666,134 A | 5/1972 | Rauch | 220/31 R |
| 3,830,954 A | 8/1974 | Caudill | 174/35 MS |
| 4,027,097 A | 5/1977 | Gillemot | 174/66 |
| 4,058,358 A | 11/1977 | Carlisle | 339/44 M |
| 4,109,095 A | 8/1978 | Kling et al. | 174/67 |
| 4,197,959 A | 4/1980 | Kramer | 220/242 |
| 4,228,317 A | 10/1980 | Cziment | 174/67 |

(List continued on next page.)

FOREIGN PATENT DOCUMENTS

| JP | 405304713 A | 11/1993 | H02G/3/18 |
|---|---|---|---|

Primary Examiner—Anthony Dinkins
Assistant Examiner—Anton Harris
(74) Attorney, Agent, or Firm—McAndrews, Held & Malloy, Ltd.

(57) ABSTRACT

An access cover for a receptacle fitting includes a cover plate connectable to the fitting at a location overlying a receptacle carried by the fitting. An access door includes a first portion slidably connected to the cover plate for movement between open and closed positions. The access door also includes a second portion having a first end pivotally connected to the access door first portion. The second end of the door second portion pivots to a first position overlying the receptacle in response to movement of the access door first portion towards its closed position, and pivots to a second position at which the receptacle is exposed and accessible through the cover plate in response to movement of the access door first portion towards its open position. Pivot features are formed on the cover plate and/or the access door for imparting rotational forces on the door second portion as the door first portion is slid between its open and closed positions. When the fitting includes multiple receptacles, the access door may be configured to cover some or all of the receptacles. Similarly, when a receptacle includes multiple terminals or outlets, the access door may be configured to cover some or all of the terminals/outlets in the receptacle. Alternatively, separate access doors of the same or different construction may be provided for each receptacle in the fitting and/or each terminal/outlet in a given receptacle.

27 Claims, 10 Drawing Sheets

U.S. PATENT DOCUMENTS

| | | | |
|---|---|---|---|
| 4,289,921 A | 9/1981 | Gartner et al. | 174/67 |
| 4,342,493 A | 8/1982 | Grenell | 339/44 M |
| 4,343,411 A | 8/1982 | Chesnut et al. | 220/242 |
| 4,458,460 A | 7/1984 | Kohaut | 52/221 |
| 4,541,538 A | 9/1985 | Swetnam | 220/3.8 |
| 4,640,564 A | 2/1987 | Hill | 339/40 |
| 4,711,634 A | 12/1987 | Antone, II et al. | 439/136 |
| 4,733,017 A | 3/1988 | Wolfe-Taylor et al. | 174/67 |
| 4,770,643 A | 9/1988 | Castellani et al. | 439/135 |
| 4,774,384 A | 9/1988 | Gregory | 174/67 |
| 4,793,818 A | 12/1988 | Poirier | 439/140 |
| 4,810,833 A | 3/1989 | Meyers | 174/67 |
| 4,857,004 A | 8/1989 | Poirier | 439/140 |
| 4,874,906 A | 10/1989 | Shotey | 174/67 |
| 4,883,924 A | 11/1989 | Hadfield | 174/48 |
| 4,952,754 A | 8/1990 | Rye | 174/53 |
| 4,952,756 A | 8/1990 | Meyers | 174/67 |
| 5,017,153 A | 5/1991 | Bowman | 439/426 |
| 5,030,795 A | 7/1991 | Domigan | 174/48 |
| 5,032,690 A | 7/1991 | Bloom | 174/48 |
| 5,041,698 A | 8/1991 | Takagi et al. | 174/66 |
| 5,107,075 A | 4/1992 | Currier, Jr. | 174/67 |
| 5,148,348 A | 9/1992 | White | 361/356 |
| 5,160,808 A | 11/1992 | Hadfield | 174/48 |
| 5,240,426 A | 8/1993 | Barla | 439/136 |
| 5,272,278 A | 12/1993 | Wuertz | 174/48 |
| 5,288,945 A | 2/1994 | Bruce | 174/67 |
| 5,306,178 A | 4/1994 | Huang | 439/536 |
| 5,563,373 A | 10/1996 | Doroslovac | 174/67 |
| 5,571,023 A | 11/1996 | Anthony | 439/142 |
| 5,588,853 A | 12/1996 | Anthony | 439/136 |
| 5,727,958 A | 3/1998 | Chen | 439/136 |
| 5,743,752 A | 4/1998 | Massebeuf | 439/142 |
| 5,866,845 A | 2/1999 | Markiewicz et al. | 174/57 |
| 5,998,735 A | 12/1999 | Patterson, Jr. | 174/67 |
| 6,018,126 A | 1/2000 | Castellani et al. | 174/48 |
| 6,114,623 A | 9/2000 | Bonilla et al. | 174/48 |
| 6,132,227 A | 10/2000 | Boteler et al. | 439/142 |
| 6,175,078 B1 | 1/2001 | Bambardekar et al. | 174/48 |
| 6,179,634 B1 | 1/2001 | Hull et al. | 439/142 |
| 6,265,662 B1 | 7/2001 | Riedy et al. | 174/48 |
| 6,307,152 B1 | 10/2001 | Bonilla et al. | 174/48 |
| 6,353,180 B1 | 3/2002 | DeBartolo, Jr. et al. | 174/48 |
| 6,417,446 B1 | 7/2002 | Whitehead | 174/48 |

Fig. 7
(Section A-A)

Fig. 8
(Section B-B)

Fig. 9
(Section C-C)

Fig. 10
(Section C-C)

Fig. 11
(Section C-C)

US 6,552,262 B2

COVER ASSEMBLY WITH PIVOTING ACCESS DOORS

RELATED APPLICATIONS

This application claims priority of Provisional Application Serial No. 60/263,483, which was filed on Jan. 23, 2001.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In-floor fittings such as poke-thru fittings, aftersets fittings, and preset fittings are installed in concrete floors to provide electrical receptacles and/or communication/data receptacles (or jacks) at desired locations in buildings. The receptacles in these fittings are typically mounted at or near the surface of the floor. As a result, the receptacles may be exposed to contaminants such as dirt, dust, and water if they are left uncovered when they are not in use. Such contaminants can adversely affect the operating of the receptacles. Hence, it is desirable to provide a cover assembly for such fitting which is designed to cover the receptacles when they are not being used.

BRIEF SUMMARY OF THE INVENTION

According to certain aspects of an embodiment of the present invention, an access cover for a receptacle fitting includes a cover plate connectable to the fitting at a location overlying a receptacle carried by the fitting. An access door is slidably connected to the cover plate for movement between a closed position and an open position. The access door includes a pivoting portion which pivots away from the cover plate to expose the receptacle in response to movement of the access door towards its open position, and which pivots towards the cover plate to cover the receptacle in response to movement of the access door towards its closed position.

The cover assembly may include a first means for pivoting the pivoting portion away from the cover plate as the access door is moved towards its open position. The first means may include a first pivot feature formed the cover plate. The first pivot feature is adapted to impart a rotational force on the access door pivoting portion to pivot the access door pivoting portion away from the cover plate as the access door moves towards its open position. The pivot feature may include a beveled surface on the cover plate which is positioned to engage against a surface of the access door.

The cover assembly may include a second means for pivoting the access door pivoting portion towards the cover plate as the access door moves towards its closed position. The second means may include a second pivot feature formed the cover plate. The second pivot feature is adapted to impart a rotational force on the access door pivoting portion to pivot the access door pivoting portion towards the cover plate as the access door moves towards its closed position. The pivot feature may include a second beveled surface on the cover plate which is positioned to engage against a surface of the access door.

The access door may include first and second portions. The first portion is slidably connected to the cover plate for movement between open and closed positions. The access door second portion has a first end pivotally connected to one end of the access door first portion. The access door second portion has a second end which is pivotally movable to a first position overlying the receptacle in response to movement of the access door first portion towards its closed position. The second end of the access door second portion is further movable to a second position at which the receptacle is exposed and accessible through the cover plate in response to movement of the access door first portion towards its open position. The access door first portion may include a connector arm that pivotally engages a pivot pin formed on the cover assembly second portion.

The receptacle may be a power receptacle, a communications/data receptacle or any other type of receptacle that should be covered when not in use. When the fitting includes multiple receptacles, the access door may be configured to cover some or all of the receptacles. Similarly, when a receptacle includes multiple terminals or outlets, the access door may be configured to cover some or all of the terminals/outlets in the receptacle. Alternatively, separate access doors of the same or different construction may be provided for each receptacle in the fitting and/or each terminal/outlet in a given receptacle.

DETAILED DESCRIPTION OF THE INVENTION

Figure 1:
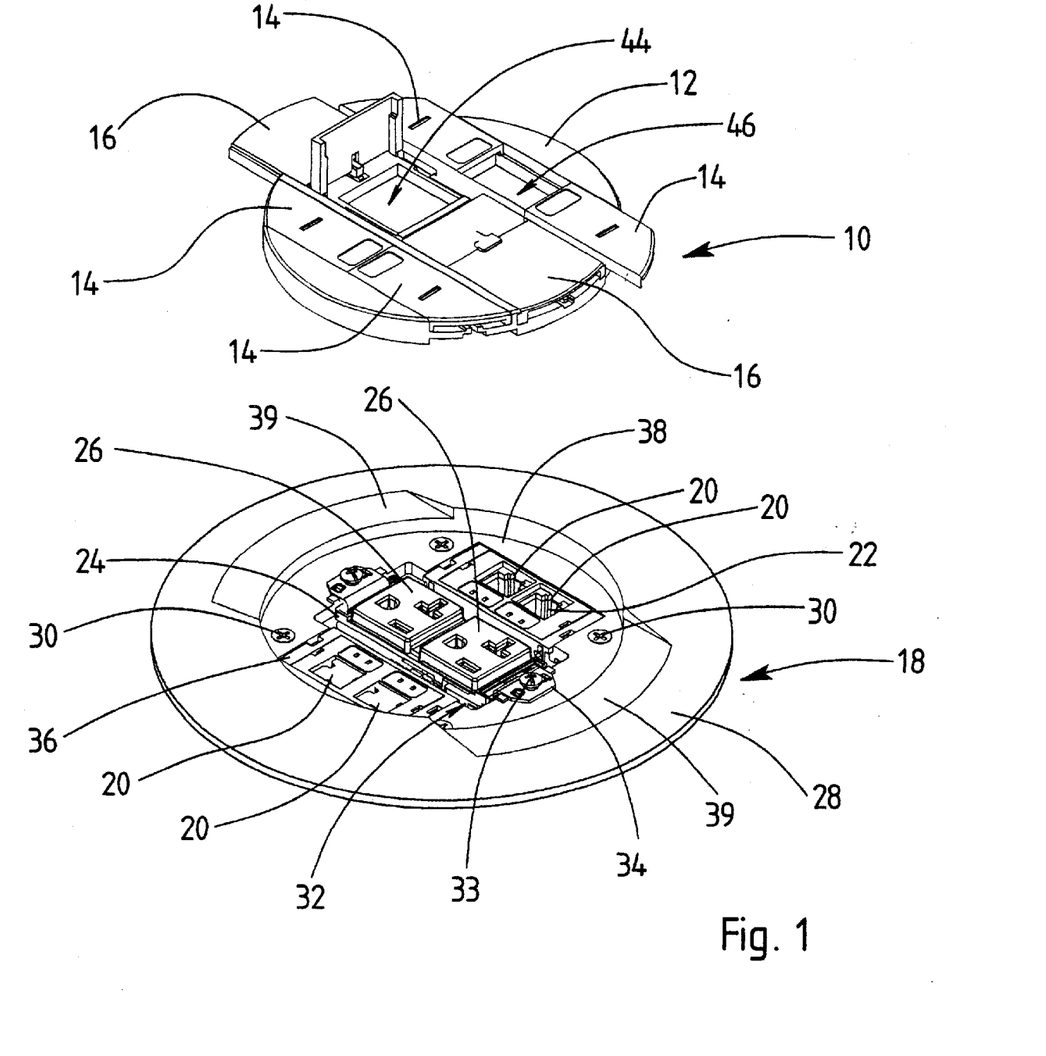
FIG. 1 is a perspective view of an in-floor fitting incorporating a cover assembly according to certain aspects of an embodiment the present invention, showing the cover assembly positioned above the in-floor receptacle fitting.
Figure 2:
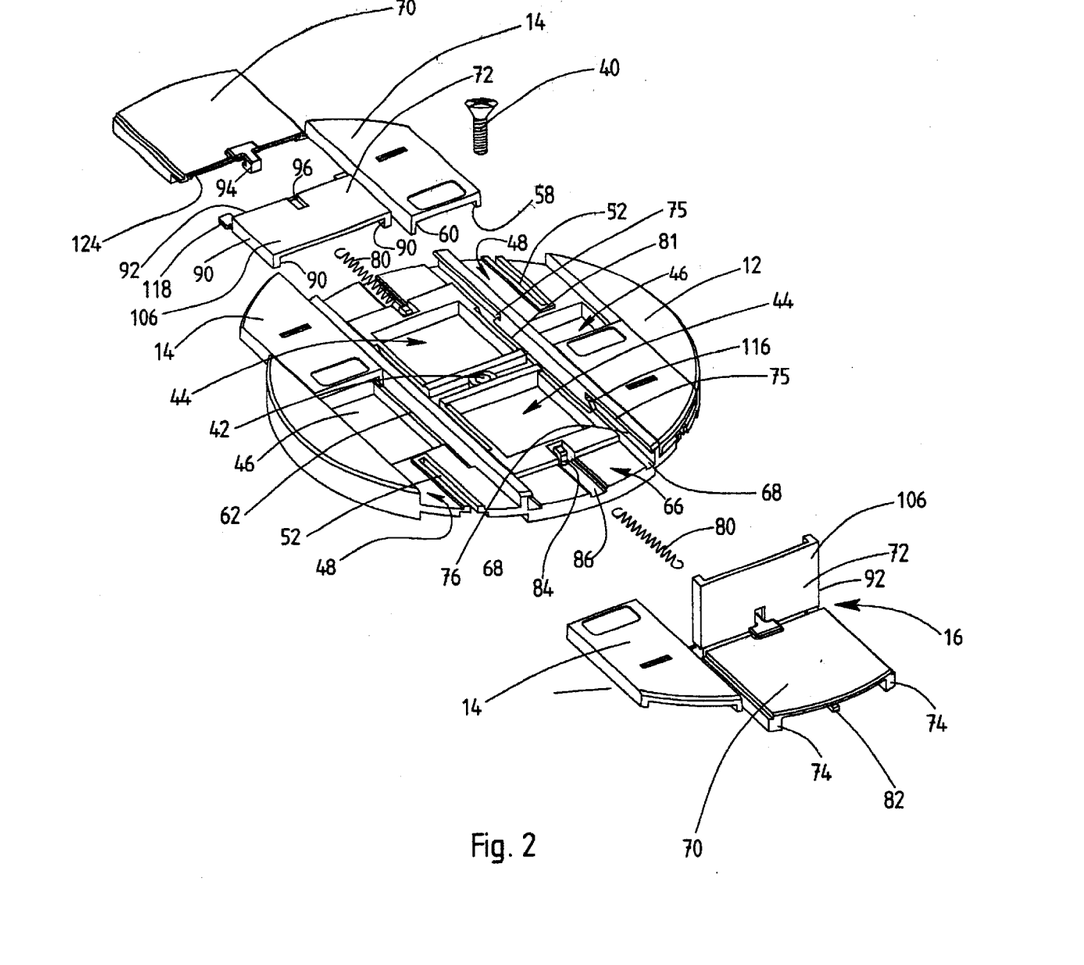
FIG. 2 is an exploded perspective view of the cover assembly of FIG. 1.
Figure 3:
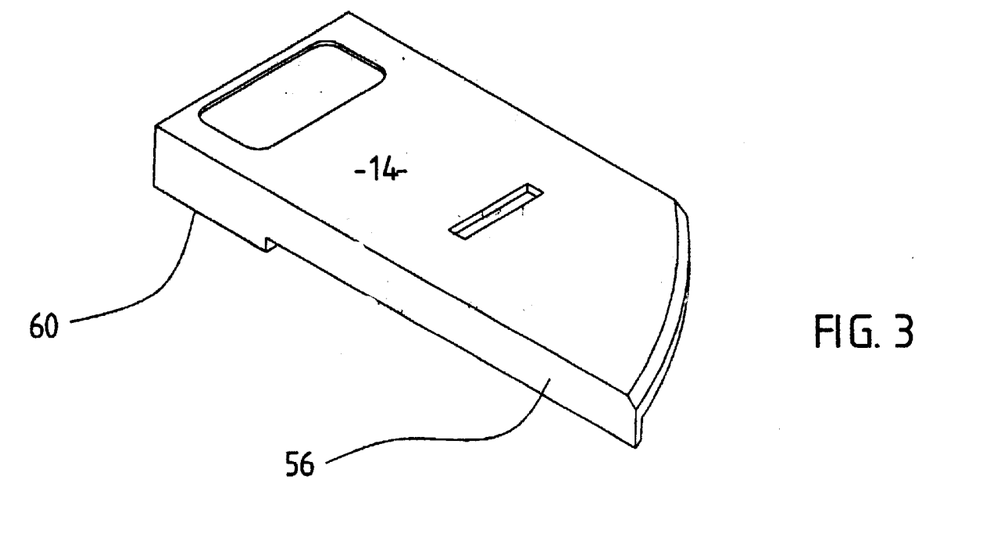
FIG. 3 is a top perspective view of a communication/data access door from the cover assembly of FIG. 1.

Referring to FIGS. 1 and 2, a cover assembly 10 according to certain aspects of an embodiment of the present invention generally includes a cover plate 12 and a plurality of access doors 14, 16 movably connected to the cover plate 12. The cover plate 12 and the access doors 14, 16 may all be formed, e.g. molded, from a suitable polymeric material, such as polyvinylchloride (PVC). The cover assembly 10 is configured to be mounted over a receptacle fitting 18, such as an in-floor fitting.

In the illustrated embodiment, the cover assembly 10 is described in connection with a poke-thru fitting of the type which is adapted to be mounted in a cored opening in concrete floor. It will be appreciated, however, that the cover assembly 10 could readily be adapted for use with other types of in-floor fittings, such as floorboxes, preset fittings or afterset fittings. The poke-thru fitting may be constructed generally in accordance with the poke-thru fittings disclosed in U.S. Pat. No. 6,018,126, which issued Jan. 25, 2000 and is entitled "Flush Poke-Through Wiring Fitting" (the "'126 patent"), and in U.S. Pat. No. 6,175,078, which issued Jan. 16, 2001 and is entitled "Flush Poke-Through Wiring Fitting Having A Height Adjustable Data Jack Mounting Bracket" (the "'078 patent").

The fitting 18 is configured to support a plurality of communication/data receptacles 20, which are adapted to be activated within the fitting 18 by communication/data signal cables (not shown). Terminals 22 in the upper faces of the communications/data receptacles 20 are accessible through openings 46 in the cover plate 12, as will be described in greater detail below. In the illustrated embodiment, the fitting 18 supports four communication/data receptacles 20.

The fitting 18 also supports a power receptacle 24, which is adapted to be activated within the fitting 18 by source power cables (not shown). In the illustrated embodiment, the power receptacle 24 is a duplex receptacle. Outlets 26 in the upper face of the power receptacle 24 are accessible through openings 44 in the cover plate 12, as will be described in greater detail below. The outlets 26 present blade openings, which are oriented for receiving a conventional male electrical plug (not shown).

In the illustrated embodiment, the power receptacle 24 is mounted in the center of the fitting 18 and the communication/data data receptacles 20 are located radially outwardly of the power receptacle 24. It will be appreciated that the number, mounting location, and specific types of receptacles will vary depending on the design of the fitting 18. For example, the communications/data receptacles 20 could be mounted in the center of the fitting 18, and the power receptacles 24 could be mounted in on the sides of the fitting 18, as is generally shown and described in U.S. patent application Ser. No. 09/642,951, which was filed on Aug. 21, 2000 and is entitled "Quad Receptacle, Dual Circuit Flush Poke-Through Wiring Fitting With Internally Mountable Communication/Data Jacks," (the "'951 application").

A trim flange 28 is secured to the fitting 18 and overlies the surface of the floor surrounding the fitting. The trim flange 28 is secured to the fitting 18 by fasteners 30 that extend through the trim flange 28 and thread into reciprocal apertures (not shown) in the fitting 18. The trim flange 28 is generally circular and includes an annular flange, which overlies the surface of the floor around the fitting. The trim flange 28 may, as is shown, be configured to function as a mounting bracket for the receptacles 20, 24. Alternatively, the fitting 18 may include internal mounting brackets (not shown) for supporting the receptacles 20, 24. In such designs, the trim flange 28 may be formed integrally with the cover assembly 10.

In the illustrated embodiment, the trim flange 28 includes a central opening 32 that overlies the fitting 18 and is configured to support the receptacles 20, 24 within an internal chamber of the fitting 18. The central opening 32 is defined by a central portion, which carries the power receptacle 24, and a pair of side portions, each of which carries two of the communication/data receptacles 20. It will be appreciated, that separate openings could alternatively be provided for each of the receptacles 20, 24.

The central portion of the central opening 32 is sized to receive and support the power receptacle 24. Fasteners 33 extend through mounting flanges 34 on the ends of the receptacle 24 and thread into reciprocal openings in the trim flange 28 for securing the power receptacle 24 to the trim flange 28. It will be appreciated, however, that the power receptacle 24 can take numerous other forms. For example, the receptacle 24 can be equipped with locking fingers (not shown) to allow it to snap mount into the trim flange 28.

Each of the side portions of the central opening 32 is configured to support two of the communication/data receptacles 20. The communication/data receptacles 20 are carried by mounting brackets 36, which may be separately or integrally formed with the receptacles 20. Each mounting bracket 36 is adapted to be mounted within the central opening 32 to support the communication/data receptacles 20 within the fitting 18.

The cover plate 12 is generally circular and is sized to fit in a generally annular recess 38 formed in the top face of the trim flange 28. The trim flange 28 includes opposed cut-out portions 39, which allow the access doors 14, 16 to slide outwardly over the annular flange. The cover plate 10 is secured in place by a fastener 40 that extends through an opening 42 in the cover plate 12 and threads into a reciprocal opening (not shown) in the power receptacle 24. Alternatively, the cover plate 12 could be secured directly to the trim flange 28 by fasteners or snap fingers, for example.

The cover plate 12 includes a plurality of access openings 44, 46 that align with the receptacles 20, 24 to provide access to the receptacles 20, 24 from above. In the illustrated embodiment, the cover plate includes four access openings. Two of the access openings 44 are sized and positioned to overlie the outlets 26 in the power receptacle 24. Each of the two other openings 46 is sized and position to overlie a pair of the communication/data receptacles 20. It will be appreciated, however, that the access openings 44, 46 can take numerous other forms. For example, separate openings could be provided for each of the communication/data jacks 20.

In the illustrated embodiment, the cover plate 12 carries four communication/data access doors 14 and two power access doors 16. Each of the communication/data access doors 14 is associated with one of the communication/data receptacles 20 and is slidably movable between a closed position (see, e.g., the lower doors 14 in FIG. 1) at which it overlies the associated communication/data receptacles 20 to prevent access thereto and an open position (see e.g. the upper doors 14 in FIG. 1) at which the associated communication/data receptacle 20 is exposed and accessible from above the floor. Similarly, each of the power access doors 16 is associated with one of the outlets 26 in the power receptacle 24 and is movable between a closed position (see, e.g., the lower, right door 16 in FIG. 1) at which it overlies the associated outlet 26 to prevent access thereto, and an open position (see, e.g. the upper, left door 16 in FIG. 1) at which the outlet 26 is exposed and accessible from above the floor.

Figure 4:
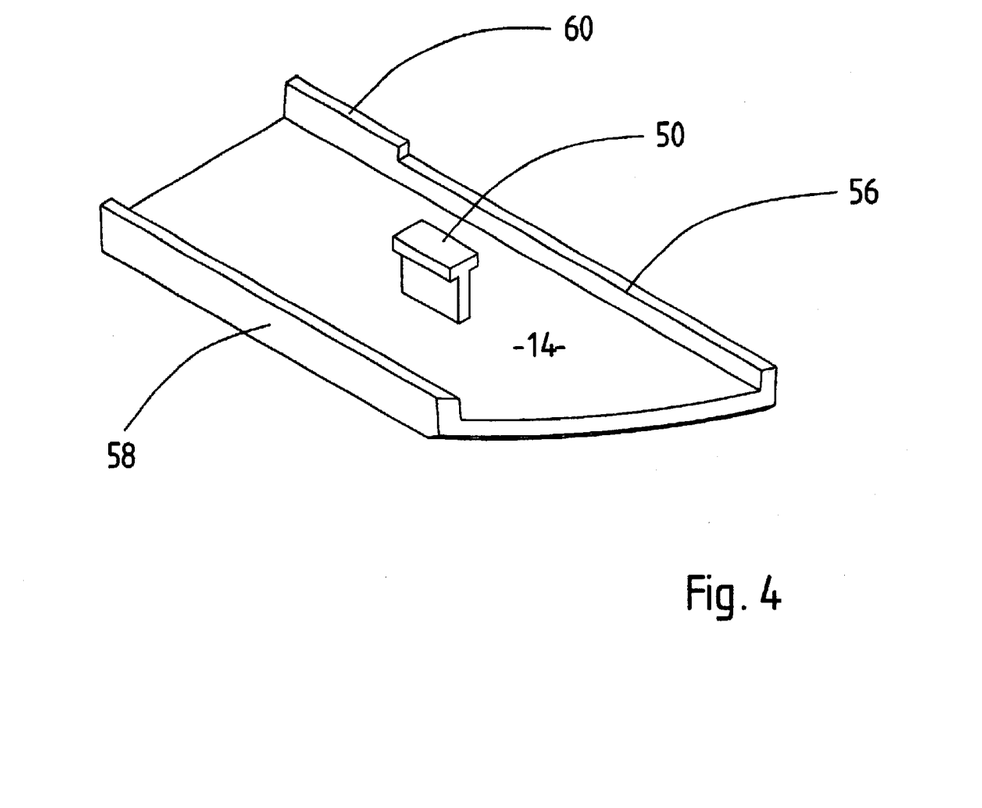
FIG. 4 is a bottom perspective view of the communication/data access door from FIG. 3.

The cover plate 12 includes two outer tracks 48, each of which extends longitudinally across one of the communication/data access openings 46. Each track 48 is adapted to carry two of the communication/data access doors 14 for movement between their open and closed positions. For this purpose, each communication/data access door 14 includes a leg 50 formed on its bottom face. (See FIG. 4). The tracks 48 include longitudinal slots 52 that are configured to receive the legs 50. Side walls 56, 58 extend downwardly from the communication/data access doors 14. The side walls 56, 58 and engage against the top surface of a respective track 48 as the communication/data access door 14 slides in the track 48. The front end of the side wall 56 includes a portion 60 of an increased height. The increased height portion 60 of the side wall 56 engages in a reciprocal groove 62 formed in the upper surface of an associated track 48. As can be seen in FIG. 2, the groove 62 does not extend all of the way to the outer end of the track 48. The interface between the outer end of the groove 62 and the increased height portion 60 of the side wall 56 serves as a stop for limiting outward movement of the door 14 in the track 48.

A communication/data access door 14 is connected to the cover plate 12 by sliding its inner end into the outer end of an associated one of the tracks 48. As the door 14 slides inwardly in the track 48, the increased height portion 60 of its side wall 56 drops into the groove 62. At about the same time, the leg 50 on the bottom of the door 14 engages into the longitudinal slot 52. The interface between the leg 50 and the inner end of the slot 52 serves as a stop for limiting inward movement of the door 14 in the track 48.

The cover plate 12 also includes a center track 66 extending longitudinally across the power access openings 44. Each half of the track 66 is identical and is adapted to carry one of the power access doors 16. Runner slots 68 formed on the sides of the track 66 extend longitudinally across the cover plate 12.

Each power access door 16 includes a first portion 70 and a second portion 72. The door first portion 70 includes legs 74 that engage in the outer portions 75 of the runner slots 68. The outer portions 75 of the runner slots 68 include top flanges 76 that overlie the legs 74 to help retain the door first portion 70 in the track 66. The door first portion 70 is slideable in the track 66 between an inner, closed position and an outer, open position. A spring 80 is provided for biasing the door first portion 70 towards its closed position. The spring 80 is connected between attachment legs 82, 84 formed on door first portion 70 and the cover plate 12. The cover plate 12 includes a longitudinal groove 86 that houses the spring 80.

Figure 6:
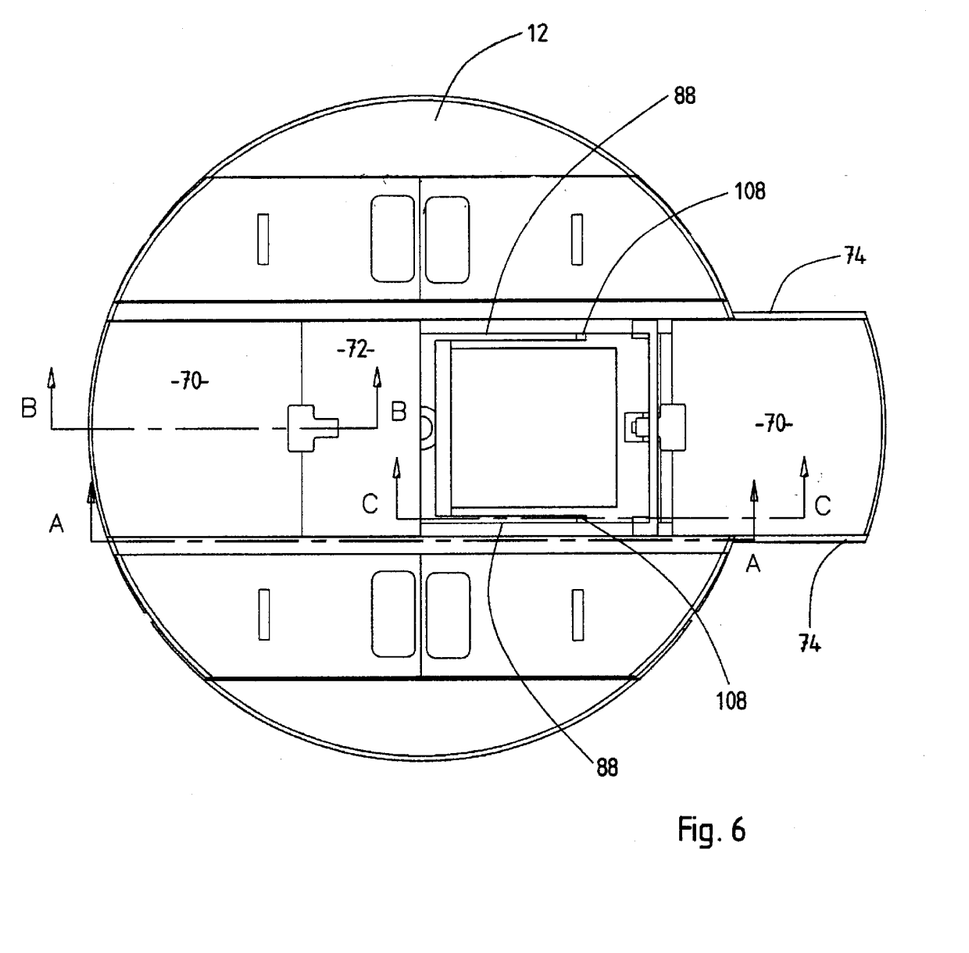
FIG. 6 is a top elevation view of the cover assembly of FIG. 1.

The door second portion 72 is positioned inwardly of the door first portion 70 in the track 66. The inner portion 81 of the runner slots 68 have cut-out portions 88 (see FIG. 6) in their inner side walls. The door second portions 72 include downwardly extending legs 90 that slide in the cut-out portions 88 of the runner slots 68.

Figure 5:
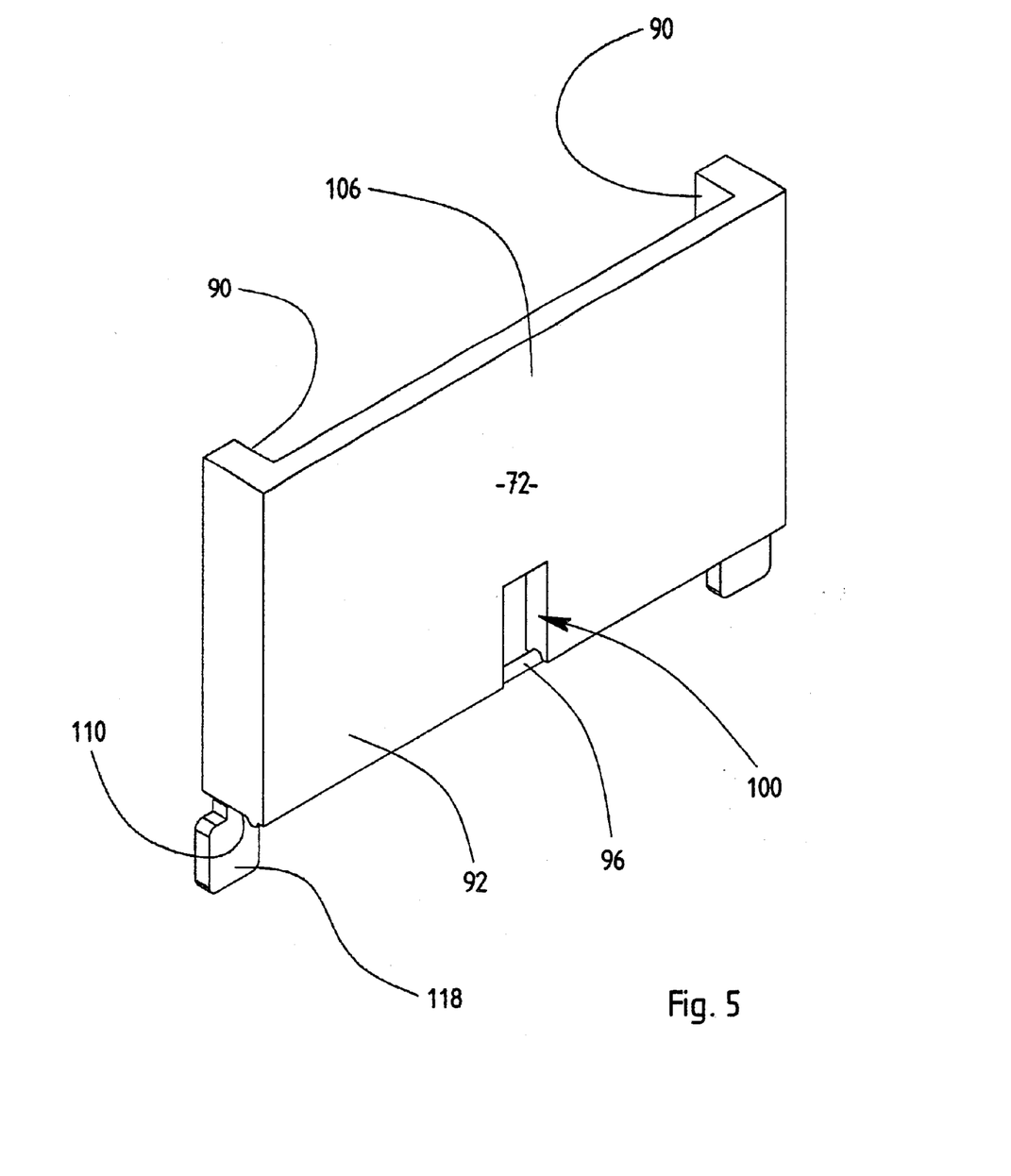
FIG. 5 is a perspective view of a second portion of a power access door from the cover assembly of FIG. 1.

The door second portion has a first end 92 pivotally connected to door first portion 70. Specifically, with reference to FIGS. 5 and 8, the door first portion 70 includes a connector arm 94 having a longitudinal slot 95. The longitudinal slot 95 engages around a pivot pin 96 carried by the first end 92 of the door second portion 72. The longitudinal slot 95 has a bottom opening 98 to allow the connector arm 94 to be hooked around the pivot pin 96 during assembly. The door second portion 72 includes a longitudinal slot 100 formed in its top wall. The slot 100 extends inwardly from the pivot pin 96 and is configured to receive the end of the connecter arm 94.

Figure 8:
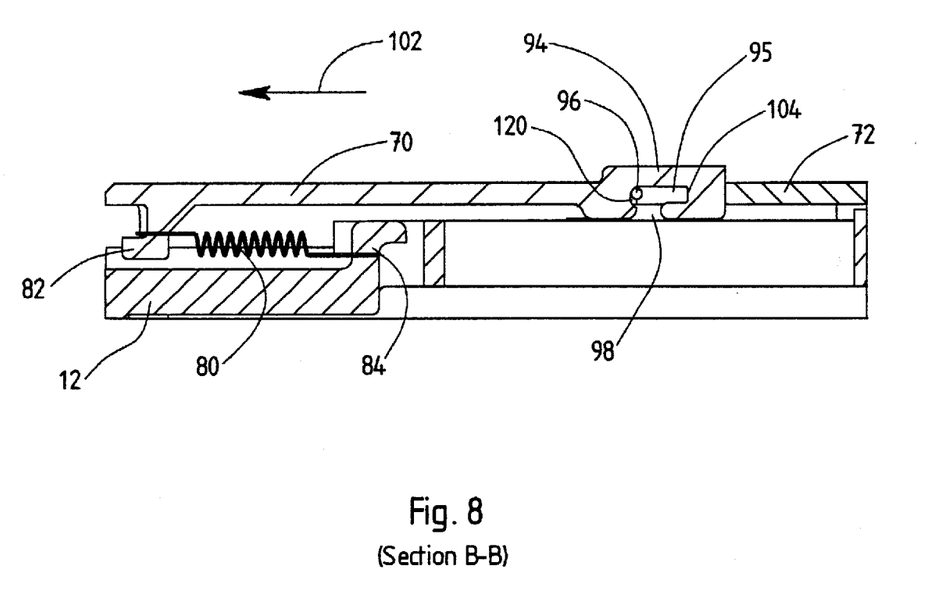
FIG. 8 is a cross-sectional view along line B—B of FIG. 6.

When the door first portion 70 is moved outwardly, e.g., in the direction of the arrow 102 in FIG. 8, the pivot pin 96 slides within the slot 95 until it is engaged by the inner end 104 of the slot 95. As the door first portion 70 continues to move outwardly, the connector arm 94 exerts a pulling force on the pivot pin 96, which causes the door second portion 72 to slide outwardly in the track 66. As this occurs, the portions 70, 72 of the door 16 will be separated by a distance equal to the length of the slot 95 in the connector arm 96. This gap between the door portions 70, 72 provides a clearance so the door second portion 72 can pivot relative to the door first portion 70.

Figure 9:
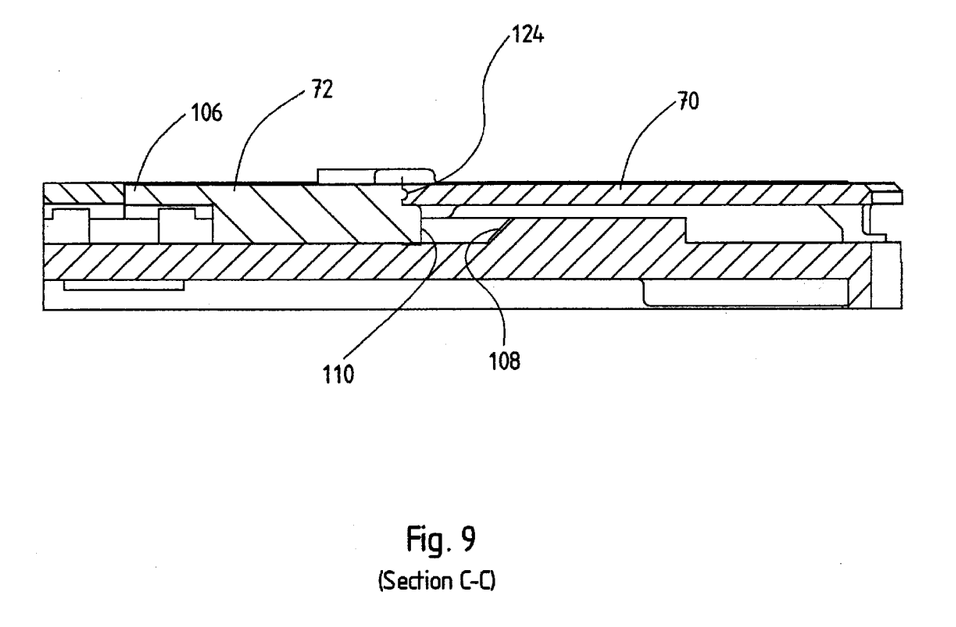
FIG. 9 is a cross-sectional view along line C—C of FIG. 6, with the power receptacle access door fully closed.
Figure 10:
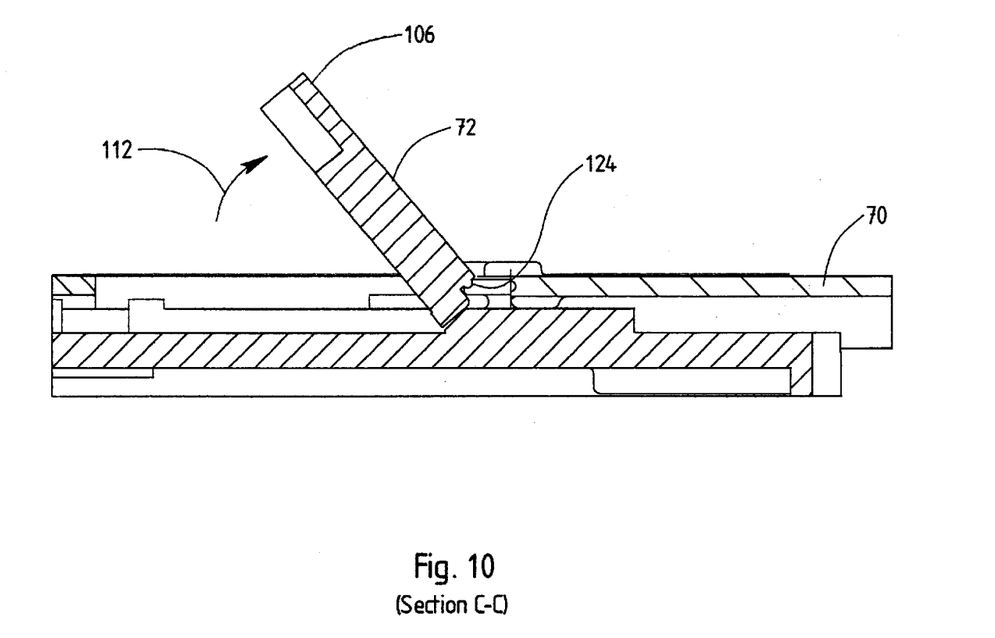
FIG. 10 is a cross-sectional view along line C—C of FIG. 6, with the power receptacle access door partially opened.
Figure 11:
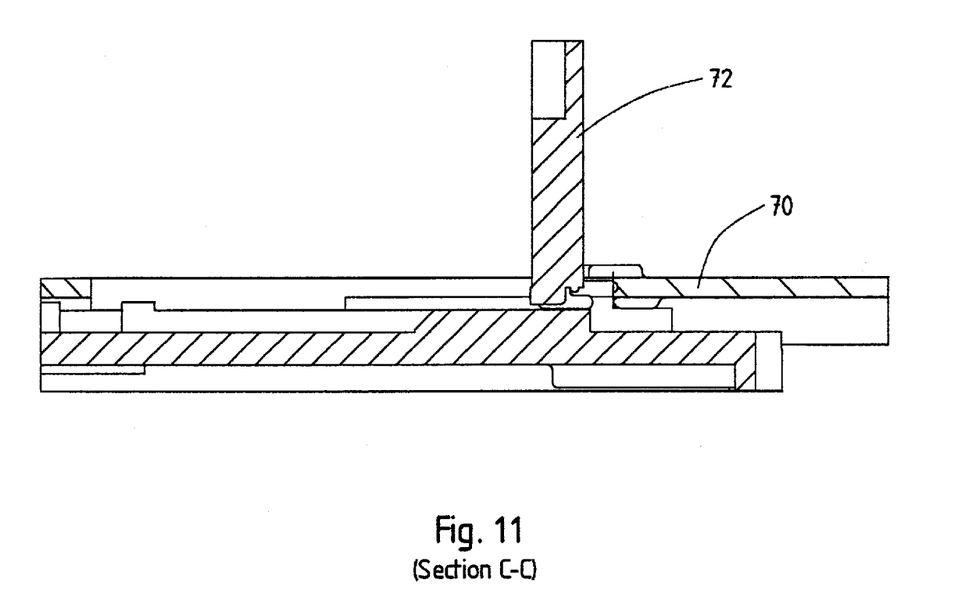
FIG. 11 is a cross-sectional view along line C—C of FIG. 6, with the power receptacle access door fully opened.

With reference to FIGS. 9–11, the access door second portion 72 has a second end 106, which is pivotally movable away from the cover plate 12 to expose the receptacle 24 in response to movement of the access door first portion 70 towards its open position. First pivot features formed on the door second portion 72 and the cover plate 12 are adapted to impart a rotation force on the door second portion 72 to pivot its second end 106 away from the cover plate 12 as the access door first portion 70 is slid towards its open position. The first pivot feature on the cover plate 12 consists of beveled surfaces 108 formed on the cut-out portions 88 of the runner slots 68. The first pivot feature of the door second portion 72 is defined by surfaces 110 on its first end 92 that are positioned to engage against the beveled surfaces 108 as the door 16 moves outwardly in the center track 66.

Specifically, as the door second portion 72 is pulled outwardly by the door first portion 70, the door second portion 72 slides in the runner slots 68 until the surfaces 110 engage against the beveled surfaces 108. (See FIG. 10) When this occurs, the outward pulling force exerted on the pivot pin 96 and the opposing force created by engagement of the beveled surfaces 108 against the surfaces 110 imparts a rotational force on the door second portion 72 in the direction 112. This is because the pulling force exerted on the pivot pin 96 is in a plane that is above the plane of the opposing force created by engagement of the beveled surfaces 108 against the surfaces 110 of the door second portion 72. As the door first portion 70 continues to pull the door second portion 72 outwardly, this rotation force pivots second end 106 of the door second portion 72 upwardly and away from the cover plate 12, thereby exposing the associated outlet 26 of the receptacle 24. (See FIG. 11).

Figure 7:
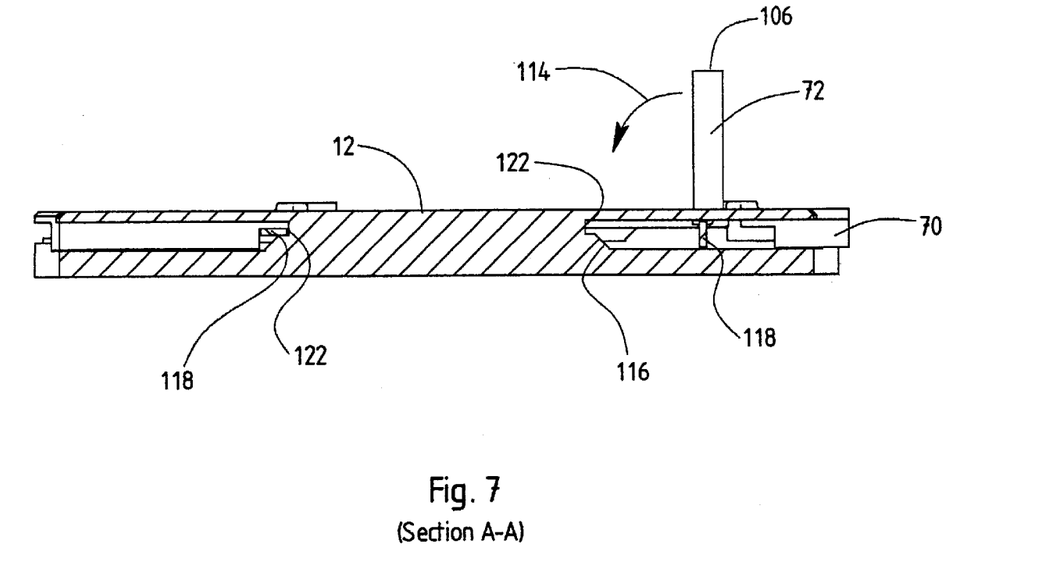
FIG. 7 is a cross-sectional view along line A—A of FIG. 6.

With reference to FIG. 7, the second end 106 of the door second portion 72 is pivotally movable in a direction 114 towards the cover plate 12 to cover the receptacle 24 in response to movement of the access door first portion 70 towards its closed or inner position. Specifically, the door second portion 72 and the cover plate 12 include respective second pivot features that are adapted to pivot the second end 106 of the door second portion 72 towards the cover plate 12 as the door 16 moves inwardly in the track 66. The second pivot feature on the cover plate 12 consists of second beveled surfaces 116 formed in the outer portions of the runner slots 68. The second pivot feature on the door second portion 72 consists of pivot legs 118 that extend from the first end 92 of the door second portion 72.

When the door first portion 70 moves inwardly from its outer, open position, the longitudinal slot 95 in the connector arm 94 slides along the pivot pin 96 until the outer end 120 of the slot 95 engages against the pivot pin 96. (See FIG. 8). When this occurs, the connector arm 94 exerts an inward pushing force (e.g., in the direction opposite the arrow 102 in FIG. 8) on the pivot pin 96, which pushes the door second portion 72 inwardly in the track 66. As the door second portion 72 moves inwardly in the track 66, the pivot legs 118 engage against the second beveled surfaces 116. When this occurs, the inward pushing force exerted on the pivot pin 96 and the opposing force created by engagement of the pivot legs 118 against the second beveled surfaces 116 imparts a rotational force on the door second portion in the direction of the arrow 114. (See FIG. 7). This is because the pushing force exerted on the pivot pin 96 is in a plane that is above the plane of the opposing force created by engagement of the pivot legs 118 against the second beveled surfaces 116. As the door first portion 70 continues to push the door second portion 72 inwardly, this rotation force pivots second end 106 of the door second portion 72 downwardly towards the cover plate 12, thereby covering the associated outlet 26 of the receptacle 24. The door 16 continues to travel inwardly until the pivot legs 118 abut against vertical surfaces 122 in the runner slot, which corresponds to the fully closed position of the access door 16. When the access door 16 is fully closed, the first and second portions 70, 72 of the door 16 firmly abut one another to protect the outlet from contaminants, such as dirt and water. The door second portion 72 includes a protrusion or flange 124. The flange 124 seats into the end of the door first portion 70 to further seal against contaminants. (See, e.g., FIG. 9). A seal (not shown) may be interposed between the first and second door portions to seal against moisture infiltration therebetween. Similarly, a seal (not shown) may be interposed between the two power access doors 16 to seal against moisture infiltration between the doors.

While particular elements, embodiments and applications of the present invention have been shown and described, it will be understood, of course, that the invention is not limited thereto since modifications may be made by those skilled in the art, particularly in light of the foregoing teachings. For example, while the pivot actuated doors 16 have been described as power access doors, it will be appreciated that doors of this construction can also be used with communications/data receptacles or any other type of receptacle that should be covered when not in use. Moreover, while separate power access doors 16 have been provided for each outlet in the power receptacle, it will be appreciated that a single door of this design could be sized to cover both of the outlets. A single door of this design could also be sized to control access to all of the receptacles in the fitting. It is therefore contemplated by the appended claims to cover such modifications as incorporate those features that come within the spirit and scope of the invention.

What is claimed is:

1. An access cover for a receptacle fitting of the type which supports at least one receptacle, the access cover comprising:
    a cover plate connectable to the fitting at a location which overlies a receptacle in the fitting; and
    an access door slidably connected to the cover plate for movement between an closed position at which the door overlies the receptacle to prevent access thereto and open position at which the receptacle is exposed and accessible through the cover plate, the access door including a pivoting portion which pivots away from the cover plate to expose the receptacle as the access door is slid towards its open position and which pivots towards the cover plate to cover the receptacle as the access door is slid towards its closed position.

2. An access cover as set forth in claim 1, further comprising a first pivot feature formed on the cover plate, the first pivot feature imparting a rotational force on the access door pivoting portion to pivot the access door pivoting portion away from the cover plate as the access door slides towards its open position; and
    a second pivot feature formed on the cover plate, the second pivot features being imparting a rotational force on the access door pivoting portion to pivot the access door pivoting portion towards the cover plate as the access door is slid towards its closed position.

3. An access cover as set forth in claim 2, wherein the first pivot feature comprises a beveled surface positioned to engage against the access door pivoting portion.

4. An access cover as set forth in claim 2, wherein the second feature comprises a beveled surface positioned to engage against the access door pivoting portion.

5. An access cover as set forth in claim 1, wherein the receptacle comprises a power receptacle.

6. An access cover as set forth in claim 5, wherein the power receptacle includes first and second outlets, and wherein the cover assembly further comprises a second access door, the second access door being slidably connected to the cover plate for movement between open and closed positions, the second access door including a pivoting portion which pivots away from the cover plate as the second access door moves towards its open position so as to expose the second outlet and which pivots toward the cover plate to cover the second outlet as the second door moves towards its closed position, and wherein the pivot portion of the other access door pivots between positions which expose and cover the first outlet in response to movement of the other access door towards its open and closed positions, respectively.

7. An access cover for a receptacle fitting of the type which supports at least one receptacle, the access cover comprising:
    a cover plate connectable to the fitting at a location which overlies a receptacle in the fitting;
    an access door having first and second portions slidably carried by the cover plate for movement between closed position at which at least part of the access door second portion overlies and covers the receptacle and an open position at which the receptacle is exposed and accessible through the cover plate; and
    means for pivoting the second portion of the door away from the cover plate as the access door is moved to its open position so as to expose the receptacle.

8. An access cover as set forth in claim 7, wherein the means includes a pivot feature formed on the access door second portion and a reciprocal pivot feature formed on the cover plate, the pivot features being imparting a rotational force on the access door second portion to pivot the access door second portion away from the cover plate as the access door moves towards its open position.

9. An access cover as set forth in claim 8, wherein the door's pivot feature comprises a surface of the door and the cover plate's pivot feature comprises a beveled surface positioned to engage against the surface on the door.

10. An access cover as set forth in claim 7, further comprising second means for pivoting the access door second portion towards the cover plate so as to cover the receptacle as the access door moves towards its closed position.

11. An access cover as set forth in claim 10, wherein the second means comprises a pivot feature formed on the access door second portion and a second pivot feature formed on the cover plate, the second pivot features imparting a rotational force on the access door second portion to pivot the access door second portion towards the cover plate so as to cover the receptacle as the access door moves towards its closed position.

12. An access cover as set forth in claim 11, wherein the door's second pivot feature comprises a leg formed on the access door second portion and the cover plate's second pivot feature comprises a beveled surface positioned to engage against the leg.

13. A method for providing access to a receptacle carried by a fitting comprising:
    providing a cover plate which overlies the receptacle; and
    providing an access door which is slidably connected to the cover plate for movement between a closed position at which the door overlies the receptacle to prevent access thereto and an open position at which the receptacle is exposed and accessible through the cover plate, the access door including a portion which pivots away from the cover plate as the access door is moved towards its open position so as to expose the receptacle and which pivots towards the cover plate as the door is moved towards its closed position so as to cover the receptacle.

14. An access cover for a receptacle fitting of the type which supports at least one receptacle, the access cover comprising:

a cover plate connectable to the fitting at a location which overlies a receptacle carried by the fitting; and an access door having first and second portions, the access door first portion being slidably connected to the cover plate for movement between open and closed positions, the access door second portion having first and second ends, the first end being pivotally connected to one end of the access door first portion, the second end being pivotally movable to a first position overlying the receptacle in response to movement of the access door first portion towards its closed position and to second position at which the receptacle is exposed and accessible through the cover plate in response to movement of the access door first portion towards its open position.

15. An access cover as set forth in claim 14, further comprising a first pivot feature formed on the access door second portion and a first pivot feature formed on the cover plate, the first pivot features imparting a rotational force on the access door second portion to pivot its second end away from the receptacle as the access door first portion is slid towards its open position.

16. An access cover as set forth in claim 15, wherein the cover plate's pivot feature comprises a beveled surface positioned to engage against a surface of the access door second portion.

17. An access cover as set forth in claim 14, further comprising a second pivot feature formed on the access door second portion and a second pivot feature formed on the cover plate, the second pivot features being adapted to impart a rotational force on the access door second portion to pivot its second end towards the receptacle as the access door first portion is slid towards its closed position.

18. An access cover as set forth in claim 14, wherein the cover plate's pivot feature comprises a beveled surface positioned to engage against a surface on the second access door.

19. An access cover as set forth in claim 14, wherein the access door second portion includes a pivot pin carried in its first end, and wherein the access door first portion includes a connector arm which pivotally engages the pivot pin.

20. An access cover as set forth in claim 16, wherein the connector arm is configured to hook around the pivot pin.

21. An access cover as set forth in claim 16, wherein the connector arm includes a longitudinal slot configured to receive the connector pin.

22. An access cover as set forth in claim 14, further comprising springs adapted to bias the access door first portion towards its first position.

23. An access cover for a receptacle fitting of the type which supports at least one receptacle, the access cover comprising:

a cover plate connectable to the fitting at a location which overlies the receptacle;

an access door having first and second portions, the access door first portion being slidably connected to the cover plate for movement between open and closed positions, the access door second portion having a first end pivotally connected to one end of the access door first portion and a second end which is pivotally movable relative to the cover plate for exposing and covering the receptacle;

a first pivot feature formed on the cover plate, the first pivot feature imparting a rotational force on the access door second portion to pivot its second end away from the cover plate so as to expose the receptacle as the access door first portion is slid towards its open position; and a second pivot feature formed on the cover plate, the second pivot feature being adapted to impart a rotational force on the access door second portion to pivot its second end towards the cover plate so as to cover the receptacle as the access door first portion is slid towards its closed position.

24. An access cover as set forth in claim 23, wherein the cover plate first and second pivot feature comprise beveled surfaces positioned to engage against surfaces on the access door second portion.

25. An access cover as set forth in claim 23, wherein the access door second portion includes a pivot pin carried in its first end, and wherein the access door first portion includes a connector arm which pivotally engages the pivot pin.

26. An access cover as set forth in claim 25, wherein the connector arm is configured to hook around the pivot pin.

27. An access cover as set forth in claim 25, wherein the connector arm includes a longitudinal slot configured to receive the connector pin.

* * * * *